(12) United States Patent
Kumar et al.

(10) Patent No.: US 9,154,580 B2
(45) Date of Patent: Oct. 6, 2015

(54) CONNECTION MANAGEMENT IN A COMPUTER NETWORKING ENVIRONMENT

(71) Applicant: Tata Consultancy Services Limited, Mumbai (IN)

(72) Inventors: Himanshu Kumar, Mumbai (IN); Nishant Kumar Agrawal, Mumbai (IN); Manoj Karunakaran Nambiar, Mumbai (IN)

(73) Assignee: Tata Consultancy Services Limited (IN)

( * ) Notice: Subject to any disclaimer, the term of this patent is extended or adjusted under 35 U.S.C. 154(b) by 246 days.

(21) Appl. No.: 13/753,567

(22) Filed: Jan. 30, 2013

(65) Prior Publication Data

US 2013/0198265 A1    Aug. 1, 2013

(30) Foreign Application Priority Data

Feb. 1, 2012  (IN) .......................... 302/MUM/2012

(51) Int. Cl.
*H04L 29/06* (2006.01)
*H04L 29/08* (2006.01)

(52) U.S. Cl.
CPC .............. *H04L 67/42* (2013.01); *H04L 67/141* (2013.01); *H04L 67/146* (2013.01)

(58) Field of Classification Search
CPC ........... G06F 15/16; G06F 9/46; G06F 21/00; H04L 67/141; H04L 67/42; H04L 67/146; H04L 29/06
USPC ...................... 709/203, 221, 227, 229; 726/4; 718/103, 104
See application file for complete search history.

(56) References Cited

U.S. PATENT DOCUMENTS

| 5,796,633 | A | 8/1998 | Burgess et al. |
| 6,976,065 | B2 * | 12/2005 | Kaiser et al. ................... 709/221 |
| 7,152,111 | B2 | 12/2006 | Allred et al. |
| 7,886,295 | B2 | 2/2011 | Burger et al. |
| 2002/0120724 | A1 * | 8/2002 | Kaiser et al. ................... 709/221 |
| 2002/0156897 | A1 | 10/2002 | Chintalapati et al. |
| 2003/0177179 | A1 | 9/2003 | Jones et al. |
| 2006/0277275 | A1 | 12/2006 | Glaenzer et al. |
| 2008/0148366 | A1 * | 6/2008 | Wahl ................................. 726/4 |
| 2008/0294778 | A1 | 11/2008 | Wang et al. |
| 2009/0003387 | A1 | 1/2009 | Bernardi et al. |
| 2009/0063687 | A1 * | 3/2009 | Turk .............................. 709/227 |
| 2009/0234957 | A1 | 9/2009 | Li et al. |
| 2010/0088423 | A1 * | 4/2010 | Mazzagatte et al. .......... 709/229 |
| 2011/0209154 | A1 * | 8/2011 | Gooding et al. .............. 718/103 |
| 2011/0296496 | A1 * | 12/2011 | O'Donnell et al. ............... 726/4 |

* cited by examiner

*Primary Examiner* — Ebrahim Golabbakhsh

(74) *Attorney, Agent, or Firm* — Schwegman Lundberg & Woessner, P.A.

(57) ABSTRACT

The present subject matter discloses a system and a method for managing a connection between a client and an application within a server in a network. In one implementation, the method includes receiving a connection request from the client. The method further includes associating with a worker thread, a unique identifier (UID) that uniquely identifies the received connection request. Further, the method involves, communicating a message that includes client data associated with the connection request to the application by the worker thread. The method also includes obtaining, by a reverse worker thread, a reply message associated with the UID from the application. The reverse worker thread is configured to communicate the reply message to the client.

15 Claims, 11 Drawing Sheets

CONNECTION MANAGEMENT IN A COMPUTER NETWORKING ENVIRONMENT

CLAIM OF PRIORITY

This application claims the benefit of priority under 35 U.S.C. §119 of Indian Patent Application Serial Number 302/MUM/2012, entitled "CONNECTION MANAGEMENT IN A COMPUTER NETWORKING ENVIRONMENT," filed on Feb. 1, 2012, the benefit of priority of which is claimed hereby, and which is incorporated by reference herein in its entirety.

TECHNICAL FIELD

The subject matter described herein, in general, relates to connection management in a computer networking environment and, in particular, relates to methods and systems for connection management in computer networking environment based on threads.

BACKGROUND

Computer applications are designed to allow users to perform certain tasks efficiently and more easily. Various types of computer applications are known today. These include, for example, enterprise applications, accounting applications, trading applications, office suites, media applications, graphic simulation applications and so on. These applications are generally packaged within a computer or implemented over a computing-based network and can be deployed over one or more servers. Furthermore, such applications are also intended for providing service to a large number of clients, who may be accessing the applications over the network, simultaneously. For instance, in a banking environment, millions of users may intend to operate at a particular instance of time. Further, a particular banking service may be availed by many users at the same instance of time. In such circumstances, it is important to manage the connections between the client and the applications on the server.

Conventional systems establish and manage connections between the clients and the applications through a connection manager. A connection manager enables access to the applications based on the request received from one or more clients. Depending on the number of client requests received, the connection manager establishes multiple connections, thereby enabling multiple users to access a specific application. Typically, such connection managers may be specific to a particular application, i.e., capable of handling requests for specific applications.

SUMMARY

This summary is provided to introduce concepts related to systems and methods for managing connections between a plurality of entities in a network and the concepts are further described below in the detailed description. This summary is neither intended to identify essential features of the claimed subject matter nor is it intended for use in determining or limiting the scope of the claimed subject matter.

In one implementation, a method for managing a connection between a client and an application within a server in a network is provided. The method includes receiving a connection request from the client. The method further includes associating with a worker thread, a unique identifier that uniquely identifies the received connection request. Further, the method involves communicating a message to the application by the worker thread. The message includes client data associated with the connection request. The method also includes obtaining, by a reverse worker thread, a reply message associated with the unique identifier from the application. The reverse worker thread is configured to communicate the reply message to the client.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
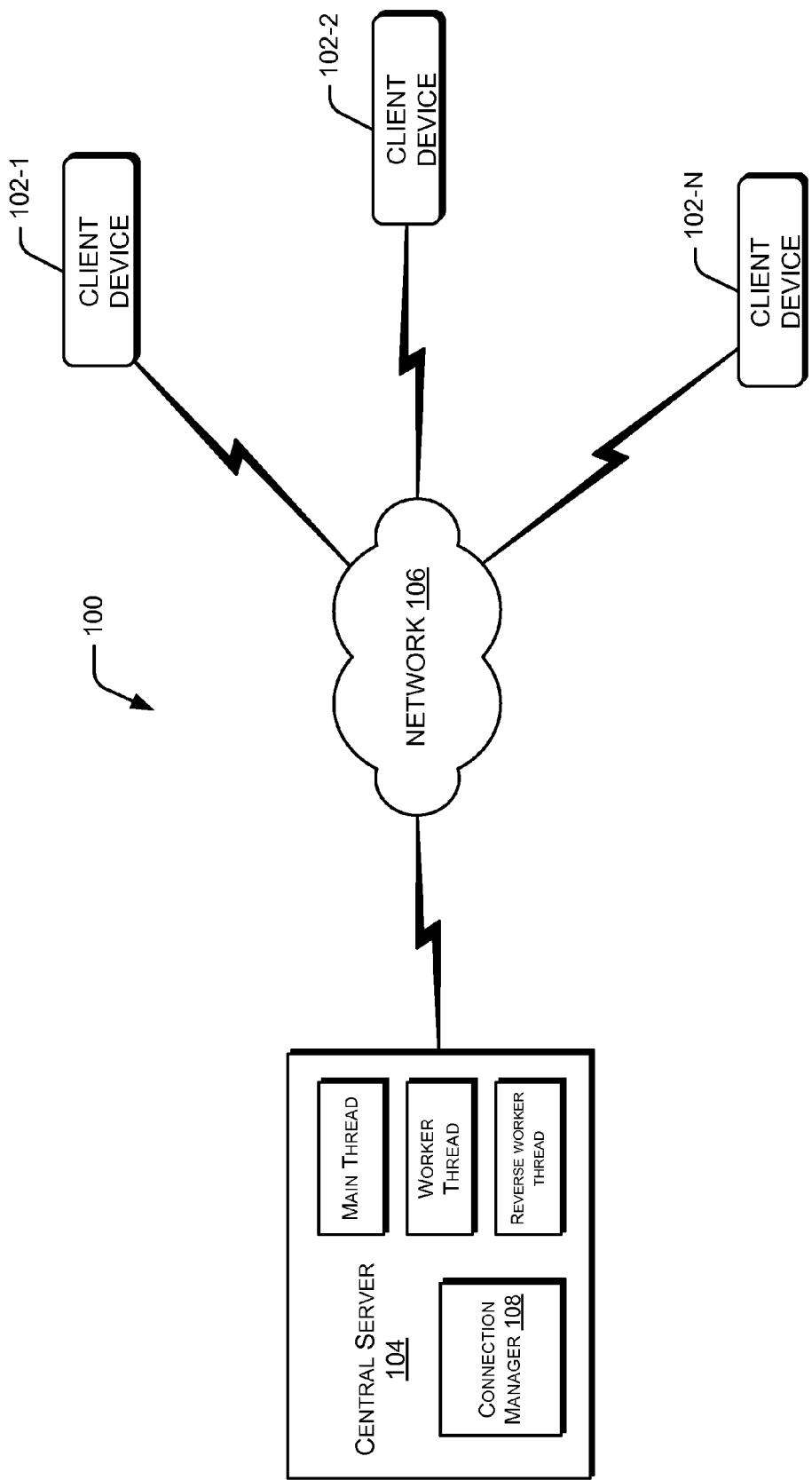
FIG. 1 illustrates a communication network environment implementing a connection management between plurality of entities, in accordance with an implementation of the present subject matter.

Systems and methods for managing connections between a plurality of clients requesting for one or more services in a computing based network, are described. In one implementation, such systems and methods can be implemented in a variety of computing environments, such as servers, clients, desktop computers, notebooks, and mobile computing environments like a smart phones and personal digital assistants (PDA).

Recently, distributed computing environments are used extensively for providing one or more functionalities. Such functionalities can be provided to one or more users, who may access a server which in turn provides such functionalities through one or more hosted applications. The functionalities that are provided are in response to one or more requests that are received from the users. For example, computing-based devices are now widely used for performing various banking related transactions where the clients or the users may access a central portal managed by a financial institution, such as a bank.

The functionalities that are required by one or more clients are typically provided over a distributed computing environment. In such a case, one or more applications can be deployed on the central server. The applications, depending on the requirement, can be accessed by one or more clients over a computing-based network, such as the Internet. The clients, through their respective client devices, can communicate with the server and access the applications accordingly.

For the present description, references to a client would also include the associated client device. Conventional systems include one or more modules for helping in establishing and maintaining connection between one or more clients and the servers, onto which one or more applications may be deployed. Such modules, referred to as a connection manager monitor incoming requests, and accordingly help in establishing and maintaining a connection with the server. Once the incoming requests are received, the connection manager may allocate resources for completing such a request. As would be appreciated by a person skilled in the art, the word server can indicate both the hardware and the software components that may be implemented on one or more of the computing-based devices.

In such conventional systems, the connection manager may be associated with a specific application. The connection manager associated with the application in question, before it comes into operation, can be initialized. Once initialized, the connection manager establishes a connection with the application under consideration. Subsequently, the connection manager checks or listens for incoming requests. Requests for other applications, however, would be managed separately by other connection managers that would be associated with such other applications. As a result, a connection manager associated with one application will not help in establishing and maintaining connections with other applications. As a result of the same, different connection managers need to be provided with different applications.

Systems and methods for managing connections between a plurality of clients and one or more applications are described. As indicated previously, the applications are implemented on a computing-based device, such as a server. References made in relation to establishing connection with an application would also include within its scope establishing connection with the server on which it is implemented. The server can be understood to be the hardware or the software on which a multitude of applications and services are provided. In one implementation, the systems and methods enable providing a connection layer between any application to establish, maintain and terminate communications between the clients and the servers.

In one implementation, the connections between the one or more clients and the applications, say on a server, can be managed through a connection manager. The connection manager in turn can be implemented on the server, on which the one or more applications are implemented.

The connection manager can be based on a multi-threaded program, which when executed on one or more processing units, results in execution of one or more concurrently running tasks, known as threads. The thread can be considered to be a sub-process of the running program. Since the concepts described herein are equally applicable to programs and threads (single or multiple), the term thread as used herein refers to a single threaded program or to a single thread within a multi-threaded program.

As indicated previously, the connection manager implements a main thread, and a plurality of worker threads and reverse worker threads. In one implementation, each of the worker threads is associated with a corresponding and unique reverse worker thread. The main thread manages the worker threads and the reverse worker threads. The main thread then subsequently listens, i.e., monitors the incoming connection requests from the client. The incoming connection request is a request for accessing one or more applications that may be implemented on the server.

On receiving an incoming connection request, the main thread generates a unique identifier (UID) for the incoming connection request. The UID uniquely identifies each and every connection request. Once the UID is determined for the incoming connection request, the main thread identifies a least loaded worker thread from amongst the plurality of worker threads. The least loaded worker thread, as per one implementation, can be identified based on the number of clients that are associated with the worker thread under consideration Therefore, lesser the number of clients that are associated with a worker thread, the lesser it is loaded.

Once identified, the incoming connection request is associated with the least loaded worker thread. The main thread sends the connection related information to the worker thread. In one implementation, the connection related information may include the UID. In another implementation, the connection related information contains information such as socket ID through which the connection is established.

Subsequently the worker thread, after receiving data from the client, prepares a message for the application deployed on the server. In one implementation, the message includes client data and the UID associated with the particular connection request. The client data, amongst other things, can include information that specifies various aspects in relation to the client request, such as the application for which access is requested, type of service requested (say a fund transfer request), and so on. Once the message is prepared, the worker thread identifies the destination to which it is to be communicated based on the message. In one implementation, the worker thread identifies the destination based on header information included in client data received.

The message is subsequently communicated to the destination, i.e., the intended application. As indicated previously, the worker thread identifies the intended application based on the client data included in the message. The message, on being received, is processed by the intended application. The intended application on receiving the message processes to generate a reply message. The reply message that is generated would be in consonance with the client data specified within the incoming message received from the client. In one implementation, the reply message further includes the UID. The reply message, when generated, is sent to the connection manager to be communicated back to the client from which the incoming message was received.

In the meanwhile, the worker thread can further associate connection related information with the UID generated by the main thread. In one implementation, the association between the connection related information and the UID can be implemented using a hash table. In such a case, the worker thread stores the connection related information in the hash table against the relevant UID.

The reply message, as described previously, is to be communicated back to a relevant client by the connection manager. The reply message from the server is received by the connection manager. In one implementation, the reverse worker thread receives the reply message. As indicated previously, each of the worker threads were associated with a reverse worker thread.

The reverse worker thread on receiving the reply message that includes the UID, from the intended application, say an application present on the server, obtains the connection related information based on the association between the connection related information and the unique identifier. In one implementation, the reverse worker thread retrieves the connection related information from the hash table, based on the UID present in the reply message. Once the relevant connection related information is retrieved, the reverse worker thread sends the message to the corresponding client identified based on the retrieved connection related information.

As will be appreciated by a person skilled in the art, systems and methods as described herein, aim at increasing system efficiency by appropriately balancing load by associating incoming connections with the least loaded worker threads. Furthermore, the described systems and methods offer other advantages including but not limited to increased throughput, latency, and scalability. The present subject matter also provides connection managers that can be configured independent of the type of application.

The above methods and system are further described in conjunction with the following figures. It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Moreover, all statements herein reciting principles, aspects, and embodiments of the present subject matter, as well as specific examples thereof, are intended to encompass equivalents thereof.

FIG. 1 illustrates a computing-based network environment 100 for managing connections between one or more client devices and a server, in accordance with an implementation of the present subject matter. In one implementation, the computing-based network environment 100 is implemented to enable connections between a plurality of clients to connect to multiple applications.

In one implementation, the computing-based network environment 100 includes a plurality of client clients 102-1, 102-2, 102-3, . . . 102-N (hereinafter collectively referred to as clients 102 and individually referred to as client 102) connected to a central server 104 (hereinafter interchangeably referred to as server 104). The clients 102 are connected to the central server 104 through the network 106. The central server 104 further includes one or more applications (not shown) which the clients 102 attempt to access to avail one or more services. Examples of such applications include, but are not limited to, banking applications, trading applications, etc. The central server 104 further includes connection manager 108. The connection manager 108 helps in establishing and maintaining connections between one or more of the clients 102 and the central server 104, and in turn the applications within the central server 104.

Each of the clients 102 and the central server 104 can be implemented as any of a variety of conventional computing devices, including, for example, servers, a desktop PC, a notebook or portable computer, a workstation, a mainframe computer, and an internet appliance.

The computing network 106 may be a wireless network, a wired network, or a combination thereof. The computing network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include network devices, such as network switches, hubs, routers, Host Bus Adapters (HBAs), for providing a link between the clients 102 and the servers 104. The network devices within the network 106 may interact with the clients 102 and the servers 104 through the communication links. The users may interact through the clients 102 with the servers 104.

In one example, the computing-based network environment 100 may comprise a network 106, such as a company network, including thousands of clients 102, such as office personal computers, laptops and server 104, such as blade servers, and other computing devices connected over the network 106. In another implementation, the network 106 can be an enterprise network with a limited number of clients 102, such as personal computers and laptops, connected over the network 106, to the server 104.

As indicated previously, the connections between the one or more clients 102 and the applications, say on the central server 104, can be managed through the connection manager 108. The connection manager 108 can be implemented as software or hardware logic, without deviating from the scope of the present subject matter. In one implementation, the connection manager 108 manages connection between the one or more of the client devices 102, using at least a main thread, one or more worker threads, and one or more reverse worker threads. The working of the connection manager 108 and the systems and devices as introduced in FIG. 1 are further described with reference to FIG. 2-3.

Figure 2:
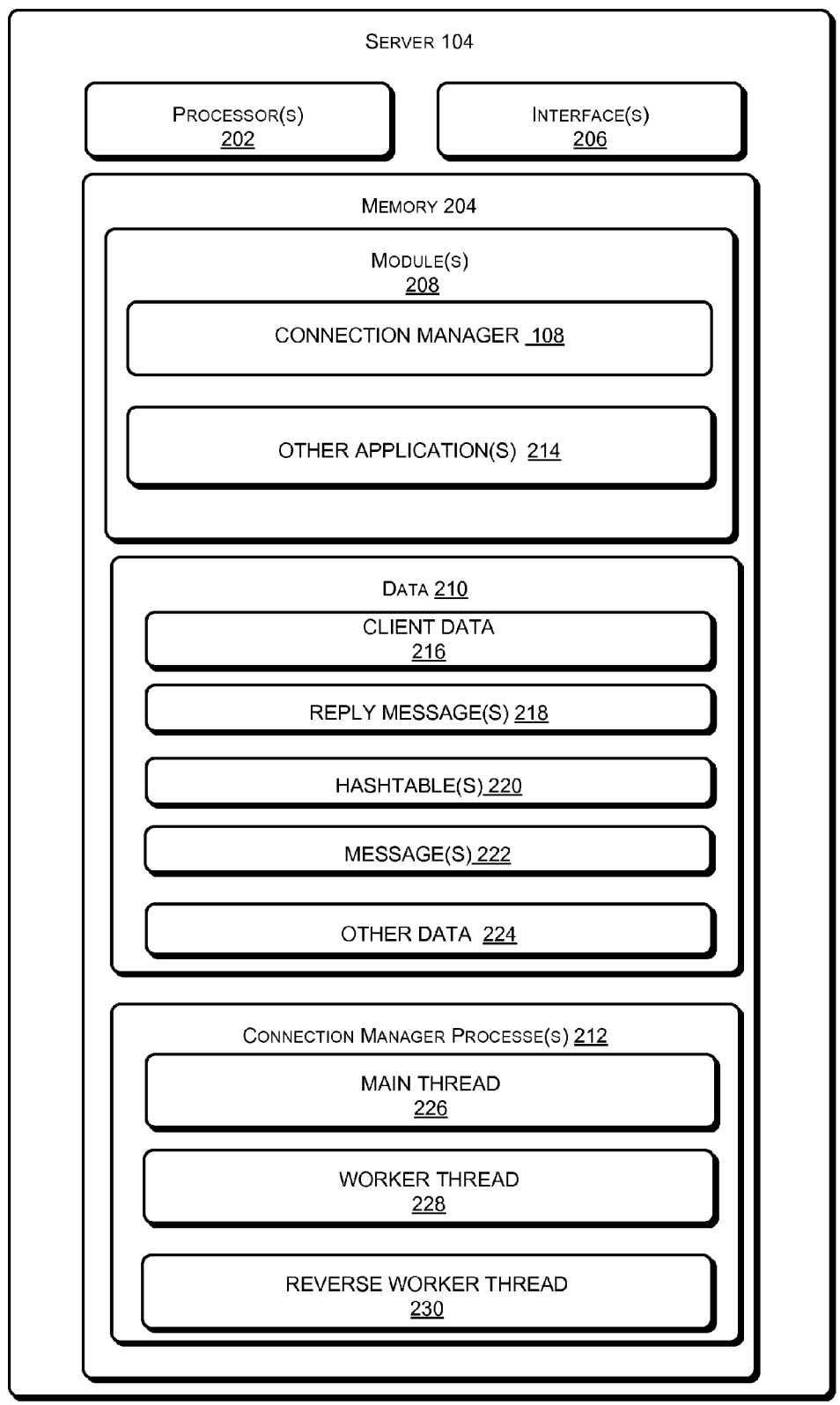
FIG. 2 illustrates a system for connection management between plurality of entities, in accordance with an implementation of the present subject matter.
Figure 3:
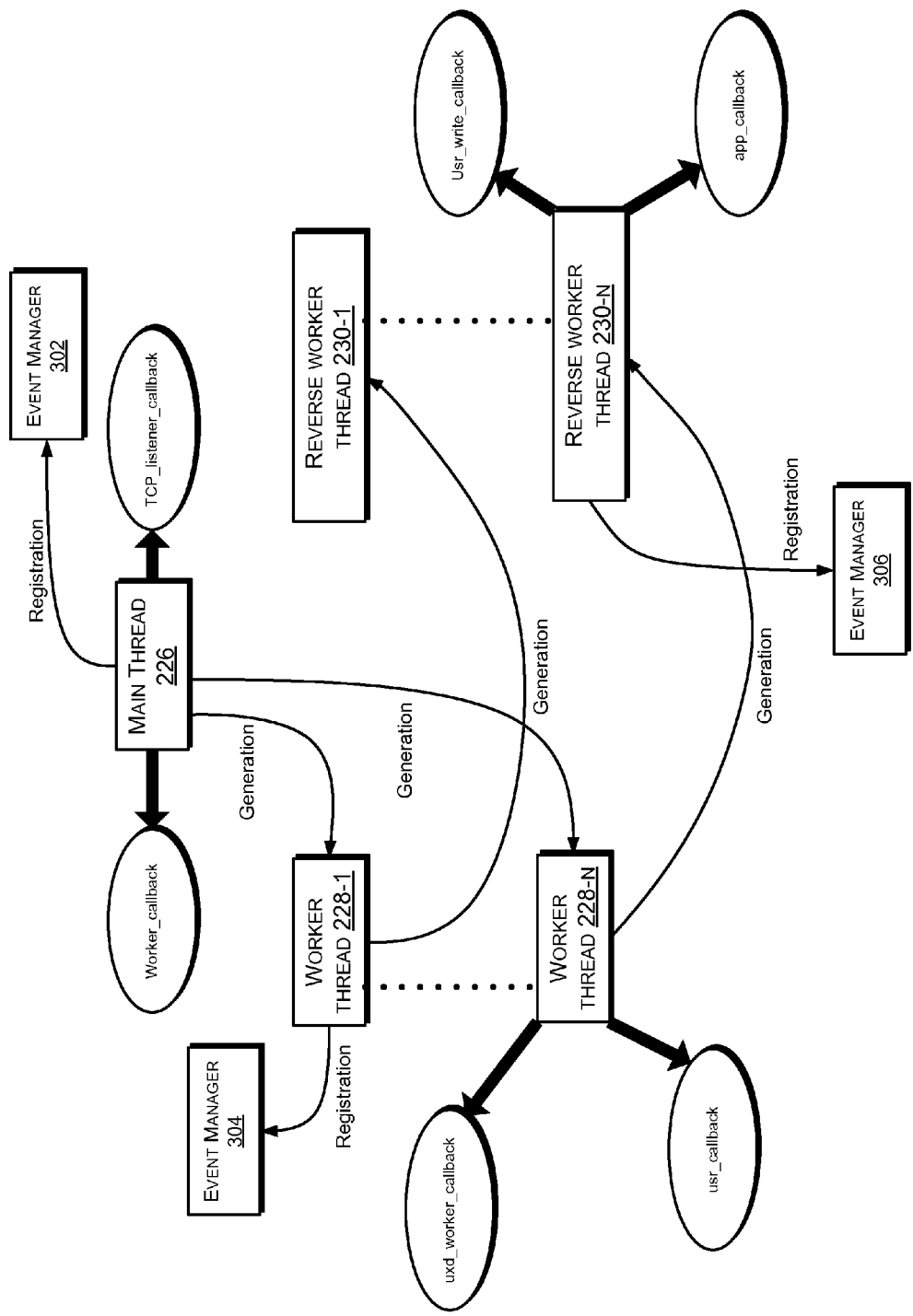
FIG. 3 illustrates an illustrative representation of the integration of a main thread, worker thread and a reverse worker thread, in accordance with an implementation of the present subject matter.

FIG. 2 illustrates a block diagram of the central server 104, according to an embodiment of the present subject matter. In said embodiment, the central server 104 includes one or more processor(s) 202, a memory 204 coupled to the processor 202, and system interface(s) 206.

The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204.

The interfaces 206 may include a variety of software and hardware interfaces, for example, interface for peripheral device(s) such as a keyboard, a mouse, an external memory, a printer, etc. Further, the interfaces 206 may enable the client 102 and the central server 104 to communicate with other computing devices, such as web servers and external databases. The interfaces 206 may facilitate multiple communications within a wide variety of protocols and networks, such as a network, including wired networks, e.g., LAN, cable, etc., and wireless networks, e.g., WLAN, etc. The interfaces 206 may include one or more ports to allow communication between the clients 102 and the central server 104.

The memory 204 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 204 further includes module(s) 208, data 210, and connection manager processes 212. The connection manager processes 212 are indicated to be present in the memory 204 of the central server 104. The connection manager processes 212 can be considered to include one or more threads for managing connections between one or more of the clients 102 and the server 104. It will be appreciated that the connection manager processes 212 when executing could also reside on the processor(s) 202.

The modules 208 include routines, programs, objects, components, data structures, etc., which perform particular tasks or implement particular abstract data types. In one implementation, the module(s) 208 include a connection manager 108, and other application(s) 214. The other applications(s) 214 may include programs or coded instructions that supplement applications and functions, for example, programs in the operating system of the computing-based network environment 100, clients 102 and the servers 104.

The data 210, amongst other things, serves as repositories for storing data processed, received, and generated by one or more of the module(s) 208. The data 210 includes client data 216, reply message(s) 218, hash table(s) 220, messages 222 and other data 224. The other data 224 includes data generated as a result of the execution of one or more modules in the other application(s) 214.

Each of the connection manager processes 212 are implemented by the connection manager 108. In one implementation, each of the connection manager processes 212 can be initialized by the connection manager 108. The manner in which the connection manager processes 212 are initialized, are described in greater detail, later in this description. The connection manager processes 212 acts as the executing sub-processes of the modules 208. The connection manager processes 212 includes a main thread 226, one or more worker thread(s) 228 and one or more reverse worker thread(s) 230 that are coupled to the one or more worker thread(s) 228. The connection manager processes 212, the data 210 and the modules 208 can be considered to be linked to each other such that on receiving a connection request from one of the clients 102, one of the modules 208 execute at least one of the connection manager processes 212 to process the data 210 transferred from the clients 102 to the servers 104 through the network 106. In an implementation, the connection manager processes 212 are capable of being executed in one or more processors 202.

The connection manager 108 is configured to help establish and manage the connections between one or more of clients 102 and central server 104 over the network 106. In one implementation, the connection between the clients 102 and the central server 104 is established based on the execution of one or more connection manager processes 212.

Message Flow in Connection Manager

In operation, the connection manager 108 monitors or listens for incoming connection requests. In one implementation, the connection manager 108 listens for incoming connection request using a TCP listener socket. The incoming connection requests are initiated by one or more of the clients 102. The connection requests are intended for establishing a connection with an intended application, say one of amongst other applications 214. For the purpose of exemplifying the present subject matter, the intended application is referred to as application 214.

The connection request for application 214 is received by the connection manager 108. As the connection request is received, the main thread 226 is initialized by the connection manager 108. The aspects of initialization of the main thread 226 and the subsequent initialization of the worker thread 228 are explained in greater detail, later in the description. The main thread 226 generates a UID and associates the same with one of the clients 102, say client 102-1, from which the connection request is received. The main thread 226 on generating the UID associates the same to the incoming connection request. The UID serves as an identifier for uniquely identifying the client, say one of the clients 102, from which the incoming connection request is received.

The main thread 226 subsequently identifies a least loaded worker thread 228 from amongst the plurality of worker threads 228. The connection manager 108 further determines the least loaded worker thread 228 based on the number of connections being managed by each of the worker threads 228. In one implementation, the main thread 226 assigns the connection, and passes the connection related information and the UID to the worker thread 228 through a UNIX domain socket.

Each of the worker thread 228 is associated with a corresponding reverse worker thread 230. In one implementation, the reverse worker thread 230 can be created by the worker thread 228. The manner in which the reverse worker thread 230 is initialized will be explained in detail, later in this description.

On obtaining the connection related information, the worker thread 228 associate it with the UID generated by the main thread 226. In one implementation, the worker thread 228 stores the connection related information in a hash table 220 against the UID Once the connection related information is associated against the UID and stored in the hash table 220, the worker thread may prepare for the application, say application 214, a message 222. The message 222, in one implementation, includes client data 216 and the UID.

As indicated previously, the client data 216 may include information such as name of the application for which the client request was initiated, type of request, time of the request, etc. In one implementation, the message 222 includes the client data 216 as part of header information. The worker thread 228 subsequently identifies the destination application, say application 214, and generates the message 222 to be communicated to the application 214, which is based on the header information obtained from the client data 216.

The message 222 is subsequently communicated to the intended application, i.e., application 214. As indicated previously, the worker thread 228 identifies the application 214 based on the header information included in the client data 216. The message 222 can then be processed by the application 214. The message 222 on being processed by the application 214 may result in the performance of a specific function associated with the application 214. For example, for an application 214 being a banking application, the processing of the message 222 may result in changes to the balance in the user's account in response to a client request for fund transfer to another user's account.

The application 214 on processing the message 222 may generate a response or a reply message. As can be gathered the reply message can be in response to one or more functions that were performed based on the processing of the message 222. The reply message further includes the UID. The reply message, when generated, is received by the connection manager 108 to be communicated back to the client, say one of the clients 102, from which the incoming message was received.

The connection manager 108 on receiving the reply message determines the relevant reverse worker thread 230 which would handle the reply message. To this end, the reverse worker thread 230 retrieves the connection information from the hash table 220, based on the associated UID included within the reply message. Once the relevant connection related information is retrieved from the hash table 220, the reverse worker thread 230 can communicate to the identified client 102.

In one implementation, in case no such connection related information is retrieved from the hash table 220, the reverse worker thread 230 discards the reply message received from the application 214. In another implementation, it is further determined from the connection related information retrieved, whether the connection in respect of the identified client is registered for a user write event or not. In case of a valid registration, the reply message is sent to a user queue. In case of no such registration, the reply message is sent to the respective client 102.

In yet another implementation, in case an error is detected while sending the reply message, the reply message is retained by the reverse worker thread 230. It may be the case that the error may have occurred due to a low bandwidth available at the client 102. In such case, the reply message can be buffered. In case a further error is detected, the user write event function is registered for that client, i.e., client 102. While executing the user write event, the reverse worker thread 230 sends the remaining part of the reply message. It detects the occurrence of any error while sending the remaining part of the reply message. In case of an error, the remaining part is again updated to be sent subsequently. In case of no error, the partial message is retrieved and sent to the corresponding client 102. In case of no messages found in the user queue i.e., no backlog message are present, the corresponding client 102 is deregistered from the user write event.

As indicated previously, the connection manager 108 implements the main thread 226, the worker thread 228 and the reverse worker thread 230. In one implementation, the main thread 226, the worker thread 228 and the reverse worker thread 230 are initialized by the connection manager 108.

Initialization of the Main Thread

In one implementation, the entire process as indicated above may begin with the initialization of the main thread 226. The initializing of the main thread 226 may include configuring the main thread 226. The information for configuring the main thread 226 can be gathered from a configuration file. The configuration file can also specify the total number of worker threads, i.e., the number of worker threads 228 that would be required for handling a connection with application 214. In another implementation, the main thread 226 also obtains service related information from a service file. The service file can be specified using eXtensible Markup Language (XML) and can be specified by a system administrator.

During the execution of the connection manager processes 212, a plurality of events may occur. Furthermore, in response to the occurrence of such events, one or more actions should also be taken. In one implementation, the connection manager 108 defines an event manager 302. Once the event manager 302 is defined, the connection manager 108 associates, i.e., registers all possible events that are likely to occur as a result of the execution of the main thread 226 with the event manager 302. In one implementation, the connection manager 108 also specifies one or more actions that need to be implemented on the occurrence of one or more of the registered events. In another implementation, the event manager 302 can be present in other applications 214.

Once the event manager is created, the main thread 226 starts listening on a path specified in the configuration file for incoming connection request from one or more clients 102. In one implementation, the main thread 226 listens for connection request at the TCP listener socket. At this stage, the main thread 226 can create a plurality of worker threads 228. In one implementation, the number of worker threads 228 that can be created can be specified in the configuration file. The initialization of the main thread 226 is further provided in detail in conjunction with FIG. 4.

Initialization of the Worker Thread

In one implementation, an event manager, such as an event manager 304, associated with the worker thread 228 can be created, in such a case, one or more events and one or more corresponding actions that need to be implemented on occurrence of the relevant events, are registered with the event manager 304 associated with the worker thread 228.

The worker thread 228 via the UNIX domain socket is registered with the main thread 226. In one implementation, once the worker thread 228 is registered with the main thread 226, the worker thread 228 opens a server queue to send the client data 216, received from the client 102, to the application 214. In another implementation, the server queue is opened by initiating a connection to a POSIX queue for establishing the communication between the connection manager 108 and the application 214. The POSIX queue allows processes to communicate and transmit data in the form of messages. Further, the worker thread 228 through an incoming queue, receives response from the central server 104.

In another implementation, the worker thread 228 further creates an incoming queue to receive the reply message from the application 214. Subsequently, the worker thread 228 creates corresponding reverse worker thread 230. In one implementation, each of the worker thread 228 can be further associated with a worker ID assigned for each worker thread 228, which is registered with the main thread 226.

Error Correction

In one implementation, the worker thread 228 can determine whether the connection established with the client 102 has an error. If it detects an error, the worker thread 228 sends a request to the main thread 226 to close the connection. In case no error is detected, the worker thread 228 decodes the header information received in the client data 216 and finds the appropriate intended application, say application 214. Once the intended application 214 is identified, the message 222 is prepared, which includes client data 216 and the UID.

In case of partial data received from the client 102, the worker thread 228 retains the partial data in the hash table 220 and sends the data to the server queue once the entire data is received from the client 102. In one implementation, the connection manager 108 may check whether there is an error in the connection established with the client 102. In case of error in the connection, a request is sent to the main thread 226 to terminate the connection with the client 102.

In case no error is detected, the header information included in the message 222 is decoded to determine the intended application 214. Subsequently the message 222 is prepared and sent to the server queue, associated with the application 214.

Exemplary Implementation

Let us consider an example, where the client 102 has sent the connection request, the main thread 226 generates a unique identifier or UID for the connection request from the client 102, say '$X_1$'. In the hash table, against '$X_1$', the worker thread 228 stores the connection related information such as the socket ID through which the connection manager received the connection request from the client 102, and other connection related information of the client 102. In an example, this data can be equal to 5 bytes.

Further to this, the worker thread 228 receives the client data 216 from the client 102, which contains the related information (say of size 100 bytes) and the header information (information related to application 214). The worker thread 228 decodes this header information and places the (service information (100 bytes)+UID ($X_1$)) in the appropriate server queue. The server processes the request and sends the reply message to the incoming queue that is obtained by the reverse worker thread 230. The reply message contains the UID ($X_1$). On receiving the reply message, the reverse worker thread 230 searches the hash table for the corresponding UID ($X_1$) and retrieve the connection related data (5 bytes) from the hash table 220. The connection related data can relate to type of user, user name, socket ID etc.

In an implementation, the reverse worker thread 230 determines the result of the search. If the data is not found as a result of the search, the reply message is discarded. In case, the search has returned any data, the connection is checked if it is registered for user write event. In case of any pre-registered user write event, the reply message is sent to the user queue. In the absence of any pre-registered user write event, the reply message is directly sent to the corresponding client 102. In the former case, i.e., if it was determined that the connection was registered for a user write event, and that the reply message, such as the reply message 218 the same are put in the user queue for accommodating all backlog message. This may occur in situations where another message may start coming even before the previous message has not completed transmission. In such cases, the reply messages are first received completely, stored in a queue. Once completed, the reply messages 218 can be transmitted one by one. This is done to ensure that none of the message is lost.

Figure 4:
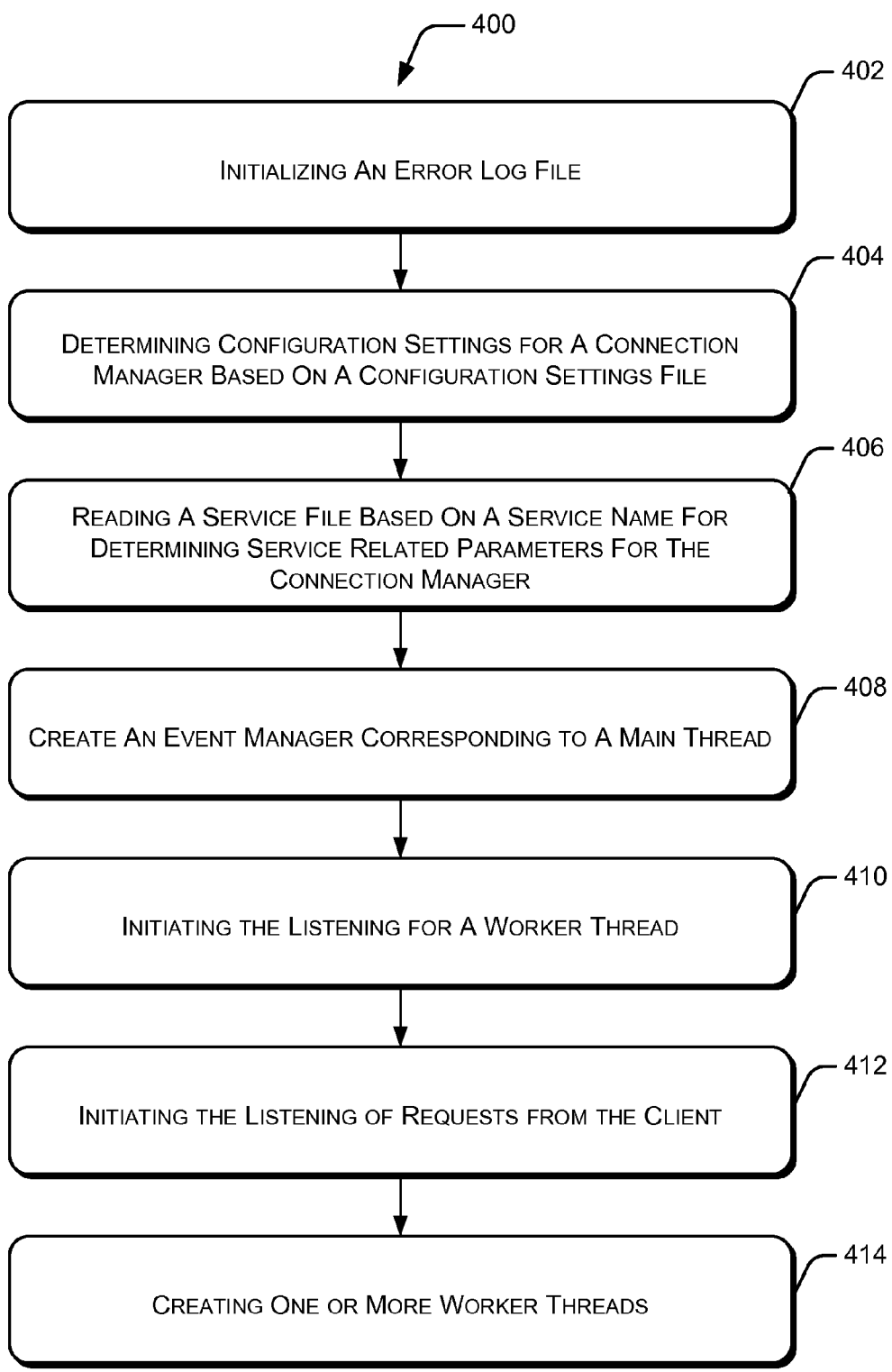
FIG. 4 illustrates a method of initializing the main thread, in accordance with an implementation of the present subject matter.

FIG. 4 illustrates a method 400 for initializing a main thread, say the main thread 226, in accordance with an implementation of the present subject matter. The exemplary method may be described in the general context of computer executable instructions. Generally, computer executable instructions can include routines, programs, objects, components, data structures, procedures, modules, functions, etc., that perform particular functions or implement particular abstract data types.

The initialization of the main thread begins at block 402. At block 402, an error log file is initialized. For example, the main thread 226 initializes an error log file. The error log file in turn can be stored in other data 224. The error log file on being created is passed as an argument and is used for indicating one or more errors that may occur during the running of the connection manager 108.

At block 404, one or more configuration settings for the connection manager can be determined. For example, the configuration settings for the connection manager 108 can be determined based on a configuration settings file. Based on the information included in the configuration settings file, the connection manager 108 can further determine one or more configuration parameters, such as number of worker threads, service name for which the connection manager 108 will be dedicated, connection manager identifier (ID), listen path for the worker, number of messages in a queue, etc. Once the configuration settings are determined, at block 406, the main thread 226 parses a service file based on the service name, to determine one or more service related parameters such as IP address, port address, uxd base path for the server (say the server 104), maximum message size and so on. In one implementation, the service file including plurality of service parameters can be stored in other data 224.

Once the configuration settings are determined, at block 408, an event manager for the main thread is created. For example, the event manager 302 is defined and the connection manager 108 associates, i.e., registers all possible events that are likely to occur as a result of the execution of the main thread 226 with the event manager 302 for the main thread 226. In one implementation, the connection manager 108 also specifies one or more actions that need to be implemented on the occurrence of one or more of the registered events. In another implementation, the event manager 302 can be present in other applications 214. In another implementation, the event manager 302 handles the events for the main thread 226 namely worker_callback and tcp_listener_callback.

At block 410, the main thread starts listening for the worker thread. For example, the main thread 226 to be able to communicate with the worker threads, say one or more of the worker threads 228, creates a socket to listen at a port. In one implementation, the port address can be specified in the configuration setting file. An example of such a socket can be a unix domain socket. As has been explained, the worker threads provide their registration requests to the main thread 226 over the provided path.

At block 412, the connection manager may further start listening for incoming clients requests. For example, the connection manager 108 may start listening for incoming client requests based on the parameters specified in the configuration setting file. In one implementation, the sockets on which the connection manager 108 listens for the incoming connection requests from one or more of the client devices 102 can be registered for a read event, with the event manager 302 associated with the main thread 226 for the events worker_callback and tcp_listener_callback.

At block 414, one or more worker threads are created. In one implementation, the main thread 226 creates one or more worker threads 228. In one implementation, the number of worker threads 228 that can be created can be specified in the configuration settings file.

Figure 5:
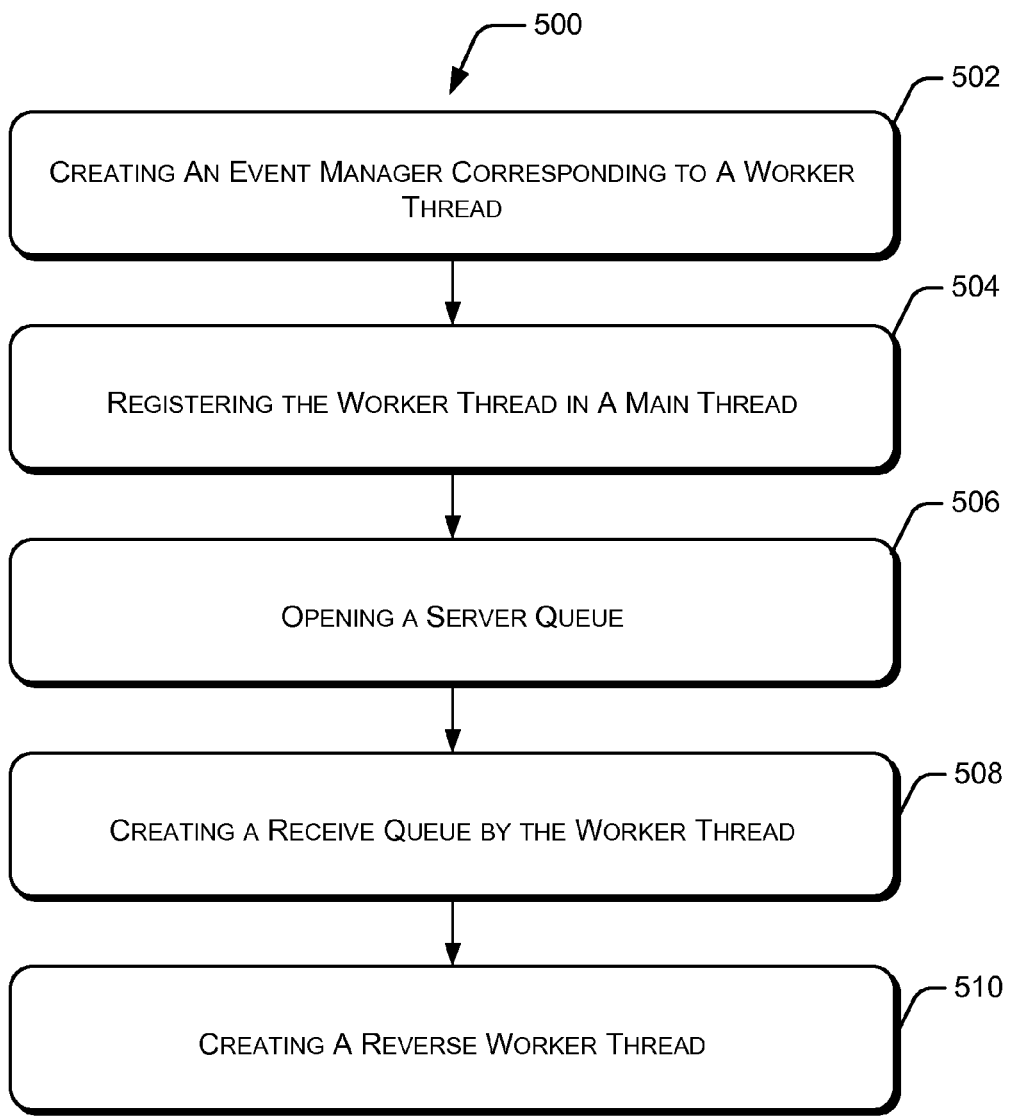
FIG. 5 illustrates a method of initializing the worker thread, in accordance with an implementation of the present subject matter.

FIG. 5 illustrates a method for initializing one or more of the worker threads, in accordance with an implementation of the present subject matter. The exemplary method may be described in the general context of computer executable instructions. Generally, computer executable instructions can include routines, programs, objects, components, data structures, procedures, modules, functions, etc., that perform particular functions or implement particular abstract data types.

As indicated previously, the main thread, say the main thread 226 creates one or more worker threads. Furthermore, the number of worker threads 228 that have to be created are specified in the configuration file.

At block 502, an event manager associated with the worker threads is created. As also indicated previously, all the events that can occur as the result of the execution of the worker threads 228 are registered with the event manager 304.

At block 504, the worker threads are registered. For example, the worker threads 228 are registered with the main thread 226. In one implementation, each of the worker threads 228 registers with the main thread 226 via the path specified in the configuration file.

At block 506, a server queue is opened. For example, one or more of the worker threads 228 can send request on the specified on a path, say unix domain socket path, to obtain the name of the queue. Once the name of the queue is obtained, the worker threads 228 opens the server queue for sending messages to server, say the server 104.

At block 508, an incoming queue is created by the worker thread. For example, the worker thread 228 creates the one or more queues for receiving messages back from the server 104. Furthermore, each of the worker threads 228 can be associated with a queue for receiving reply from the server 104. In one implementation, the queue can be identifiable by queue name. The queue name in turn can include a connection manager ID, a worker thread ID, etc.

At block 510, one or more reverse worker threads are created. For example, the main thread 226 creates one more reverse worker threads 230 for each of the worker threads 228. In one implementation, the number of reverse worker threads 230 is exactly similar to the number of worker threads 228. Furthermore, each of the reverse worker threads 230 uniquely corresponds to its respective worker threads 228.

Figure 6:
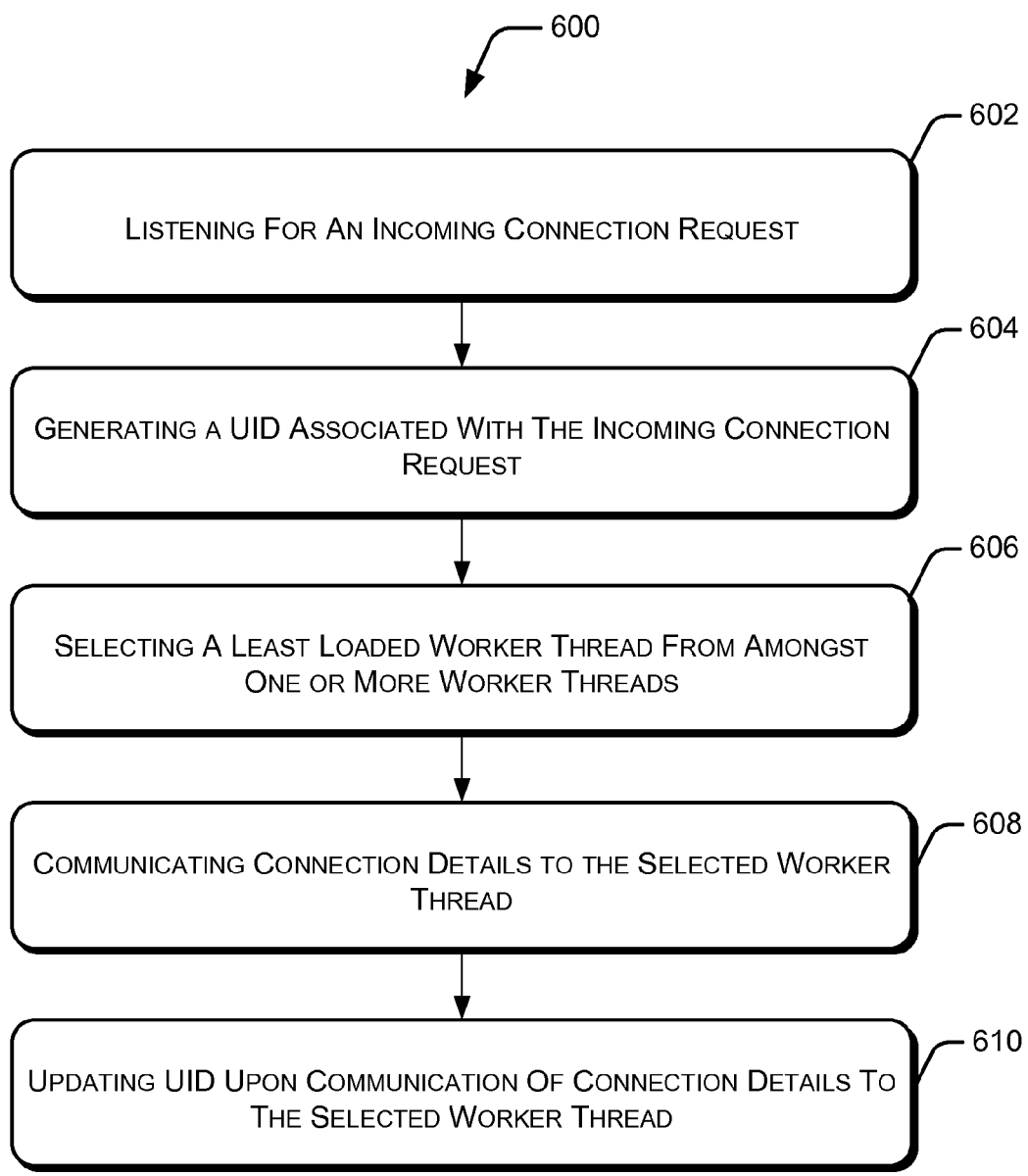
FIG. 6 illustrates a method of handling connection requests by the main thread, in accordance with an implementation of the present subject matter.

FIG. 6 illustrates a method 600 indicating the working of the main thread, in accordance with an implementation of the present subject matter. The exemplary method may be described in the general context of computer executable instructions. Generally, computer executable instructions can include routines, programs, objects, components, data structures, procedures, modules, functions, etc., that perform particular functions or implement particular abstract data types.

At block 602, the main thread listens for an incoming connection request. For example, the main thread 226 listens for the incoming connection request on the port specified in the configuration file. As also mentioned briefly above, an incoming connection request can be considered to include requests for accessing one or more applications that may be implemented on the server.

At block 604, a unique identifier associated with an incoming connection request is generated. For example, the main thread 226 generates a unique identifier or UID for the incoming connection request. The UID generated by the main thread 226 is unique for each incoming connection request, and hence uniquely identifies each of the incoming connection request. In one implementation, the main thread 226 may execute tcp_listener_callback routine to generate the UID.

At block 606, a least loaded worker thread is selected. For example, the main thread 226 determine the least loaded worker thread, say worker thread 228-1 from amongst the worker threads 228. In one implementation, the least loaded worker thread 228-1 is identified based on the number of clients that are associated with the each of the corresponding worker threads 228.

At block 608, connection details associated with the incoming connection request are communicated to the worker thread. For example, the main thread 226 communicates the connection details to the selected least loaded worker thread, i.e., the worker thread 228-1. In one implementation, the connection details include the UID, socket descriptors, etc. Furthermore, if required the UID in some cases can be updated (block 610), for example, once the connection details are communicated to the selected worker thread 228-1.

In one implementation, whenever any request is sent by any of the worker threads 228, say worker thread 228-1, to the main thread 226, the main thread 226 can execute the worker_callback routine. Based on the type of request received from the worker thread 228-1, the main thread 226 may process the request. Once processed, the main thread 226 then updates the data associated with the worker thread 228-1.

Figure 7:
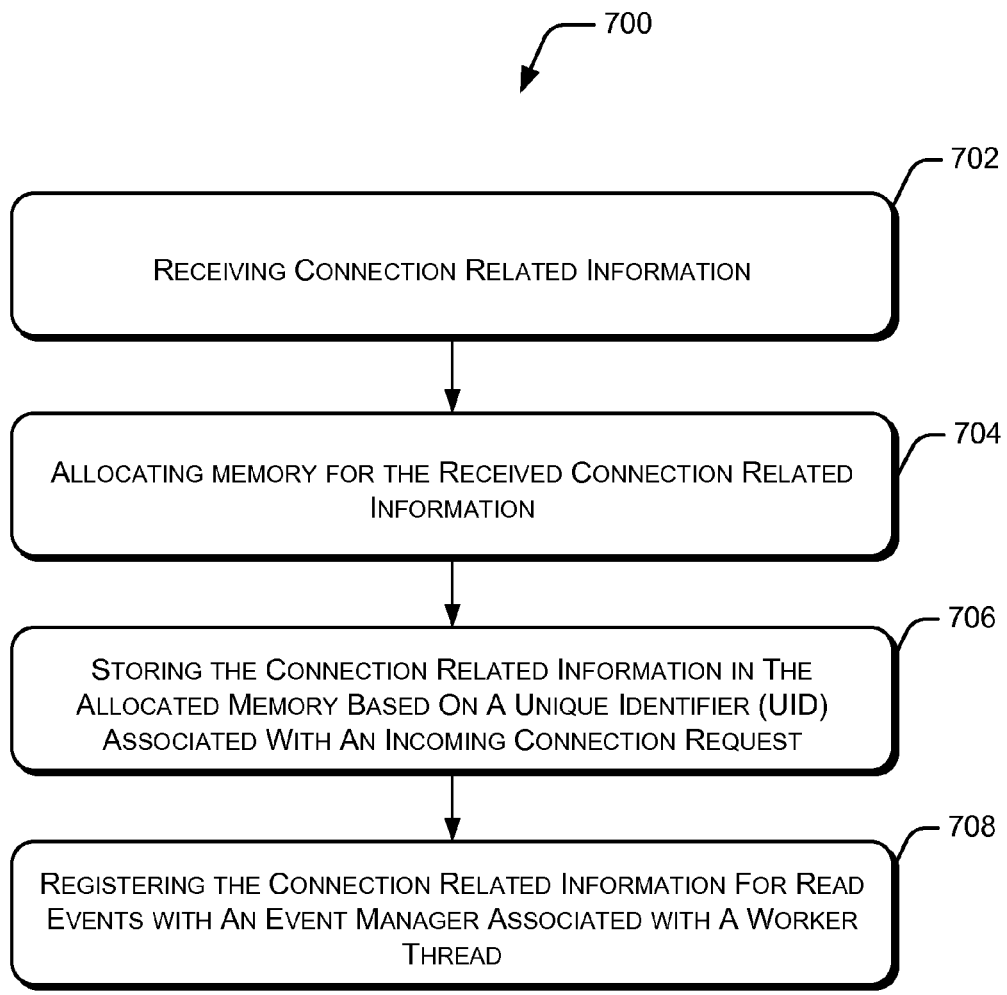
FIG. 7 illustrates a method of handling connection requests by the worker thread, in accordance with an implementation of the present subject matter.

FIG. 7 illustrates a method 700 of handling connection requests by the worker thread, in accordance with an implementation of the present subject matter. The exemplary method may be described in the general context of computer executable instructions. Generally, computer executable instructions can include routines, programs, objects, components, data structures, procedures, modules, functions, etc., that perform particular functions or implement particular abstract data types.

At block 702, connection related information is received. For example, one of the worker threads 228, say worker thread 228-1, receives connection related information from the main thread 226. The connection related information can include, in one implementation, the UID, socket descriptors for the connection, etc. In one implementation, the connection information is received in response to the execution of the routine uxd_worker_callback.

At block 704, memory is allocated for the received connection related information. For example, the worker thread 228-1 allocated memory based on the received connection related information.

At block 706, the connection related information is stored in the allocated memory. For example, the worker thread 228-1 stores the connection related information is stored in the allocated memory. In one implementation, the worker thread 228-1 stores the connection related information in a hash table. The connection related information stored in the hash table is stored against the UID associated with the incoming connection request.

At block 708, the connection related information is registered for read events. For example, the worker thread 228-1 registers the connection related information for read events with the event manager 304 associated with the worker thread 228-1. In yet another implementation, the connection related information is registered with the usr_callback function.

Figure 8:
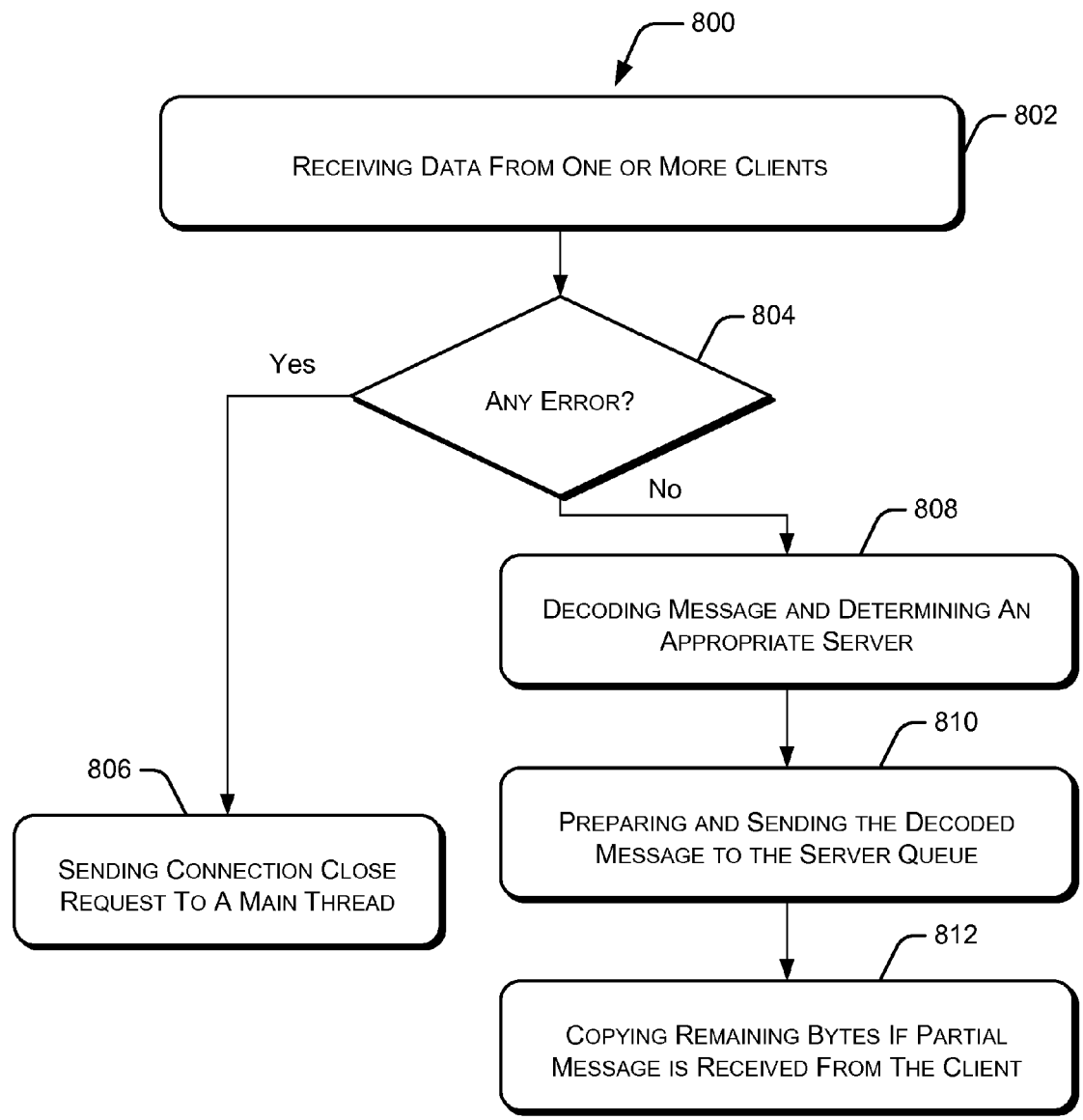
FIG. 8 illustrates a method of processing an incoming connection request and preparing a message for a central server by the worker thread, in accordance with an implementation of the present subject matter.

FIG. 8 illustrates a method 800 of processing of client data 216 received from one or more of the client devices, and preparing a message by the worker thread, in accordance with an implementation of the present subject matter. The exemplary method may be described in the general context of computer executable instructions. Generally, computer executable instructions can include routines, programs, objects, components, data structures, procedures, modules, functions, etc., that perform particular functions or implement particular abstract data types.

At block 802, data from one or more of the clients or users is received. For example, the one of the worker threads 228, i.e., the worker thread 228-1 receives data from one of the client devices 102, say client device 102-1. In one implementation, the socket at which the data is received from the client device 102-1 is categorized as ready to be read. In another implementation, the worker thread 228-1 executes the user_callback function. In one implementation, the data received from the client device 102-1 is stored in a buffer.

At block 804, a determination is made to ascertain whether any error occurred during the receiving of the data from one of the client devices. In case it is determined that an error had occurred in receiving the data from the client device 102-1 ('Yes' path from block 804), a connection close request is sent to the main thread 226 (block 806) for closing the connection.

In case it is determined that an error did not occur ('No' path from block 804), the appropriate server to which the received data from the client device 102-1 has to be sent, is determined (block 808) by decoding the data received from one of the client devices. In one implementation, the buffer and the data received from the client device 102-1 may be parsed to determine the required identification of the server. In another implementation, the identification of the relevant server, say server 104, can be determined based on a transcode information. The transcode information, amongst other aspects, identifies the server to which the data has to be communicated.

At block 810, a message is prepared for the identified server and placed in a queue opened by the worker thread. As also discussed above, the worker thread, say the worker thread 228-1 opened a server queue at the time of its initialization. In one implementation, the worker thread 228-1 generates the message for application which is deployed on the server 104. In one implementation, the message includes client data 216 and the UID associated with the particular connection request. The client data 216, amongst other things, can include information that specifies various aspects in relation to the client request, such as the application for which access is requested, type of service requested (say a fund transfer request), and so on. Once the message is prepared, it is communicated to the identified server by the worker thread 228-1.

At block 812, in case data received from the client device was partial, the remaining bytes of the received data can be copied. For example, the worker thread 228-1 can copy the partial received data to a connection buffer. In such a case, the remaining bytes when received can also be stored in the connection buffer, and the data now in its completed form can be transmitted to the server 104.

Figure 9A:
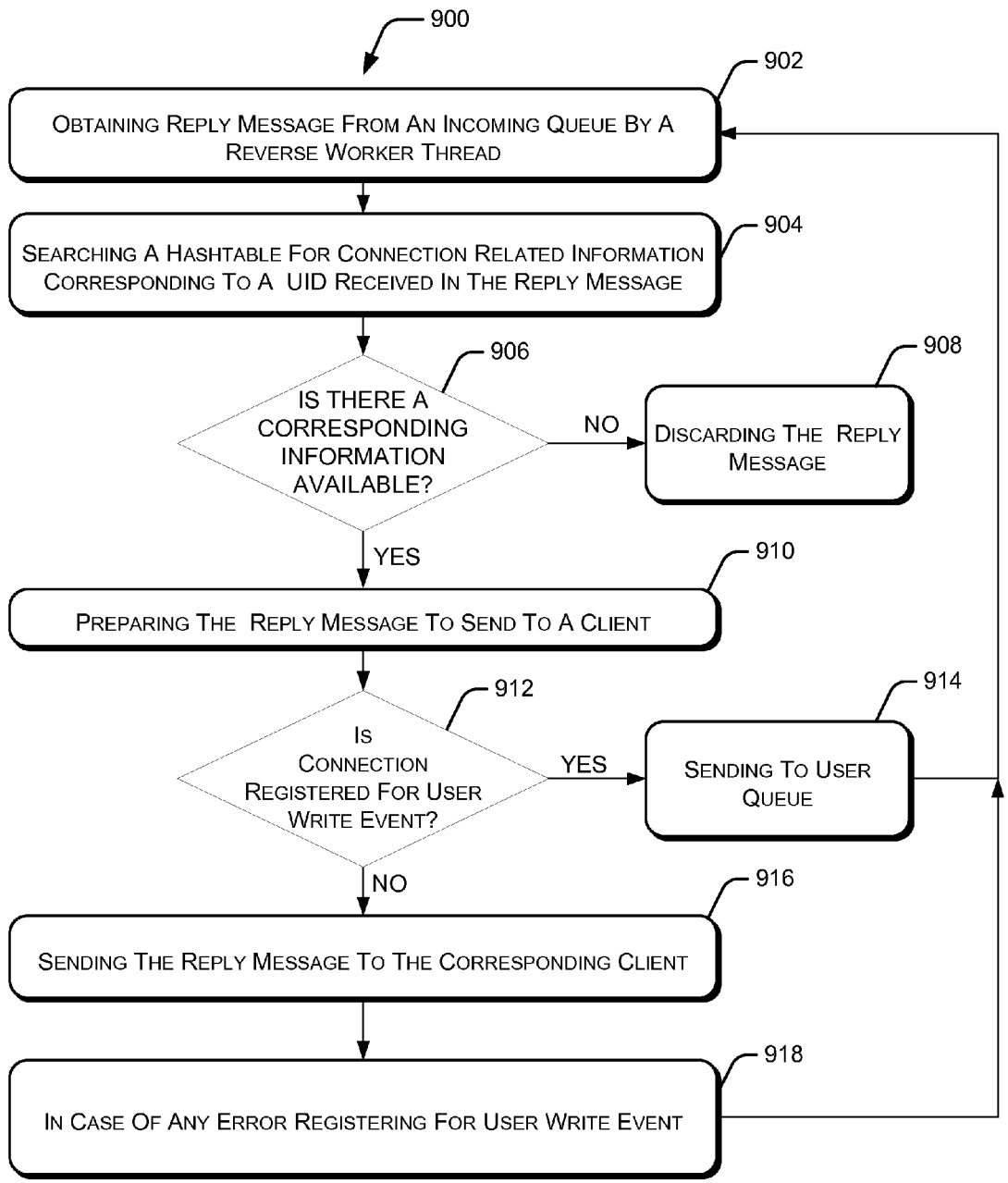
FIG. 9A illustrates a method of processing the message by the reverse worker thread, in accordance with an implementation of the present subject matter.

FIG. 9A illustrates a method 900 indicating the manner in which the reverse worker thread prepares and send data to the respective client, in accordance with an implementation of the present subject matter. The exemplary method may be described in the general context of computer executable instructions. Generally, computer executable instructions can include routines, programs, objects, components, data structures, procedures, modules, functions, etc., that perform particular functions or implement particular abstract data types.

At block 902, a reply message from an incoming queue is obtained. For example, the reply message 218 is obtained from the incoming queue associated with the reverse worker thread 230. As indicated previously, the reply message 218 generated by the central server 104 is placed in the incoming queue by the central server 104. The reverse worker thread 230 reads the reply message 218 in the incoming queue for further processing of the reply message 218.

At block 904, connection related information corresponding to the UID is searched. For example, the reverse worker thread 230 searches the hash table 220 for the client information, i.e., the connection related information based on the UID received in the reply message 218. The connection related information stored in the hash table against the particular UID based on which the reverse worker thread 230 searches, contains information relevant to identify the corresponding client 102 to which the reply message 218 from the central server 104 is to be sent.

At block 906, a determination is made to ascertain whether connection related information is present against the UID under consideration. For example, the reverse worker thread 230 determines whether corresponding information related to the client is available in the particular search location in the hash table 220 or not. If the required information is not available ('No' path from block 906), the reverse worker thread 230 discards the reply message 218 received from the central server 104 (block 908).

If the connection related information is present ('Yes' path from block 906), the reverse worker thread 230 determines the corresponding connection related information in the hash table 220, and identifies the client 102 to which the reply message has to be sent. The reverse worker thread 230 prepares the reply message 218 based on the identified information (block 910).

At block 912, a determination is made to ascertain whether the connection associated with the connection related information has been previously registered for a user write event. For example, the reverse worker thread 230, based on the retrieved connection related information, determines whether the connection with the client 102 is registered for a user write event. In one implementation, the user write event can be registered under at least two circumstances. In the first case, the reply message 218 received from the central server 104 is partial. Secondly, when the reverse worker thread 230 encounters an error while sending the reply message 218 to the corresponding client 102.

If the connection under consideration had been registered previously for a user write event ('Yes' path from block 912), the reverse worker thread 230 sends the reply message 218 to user queue (block 914). In one implementation, the backlogged reply messages 218 can be enqueued in the user queue. Furthermore, the reverse worker thread 230 can check for reply messages 218 in the user queue.

If however, it is determined that the connection under consideration was not previously registered ('No' path from block 912), the reverse worker thread 230 sends the reply message 218 to the corresponding client 102 directly. In one implementation, the reverse worker thread 230 identifies the client 102 based on the connection related information retrieved from the hash table 220 (block 916).

At block 918, in case of an error, the connection is registered for a user write event. In case of no messages found in the user queue, this occurs mainly due to loss in connection between the client 102 and the connection manager 108, the corresponding client 102 is deregistered from the user write event.

Figure 9B:
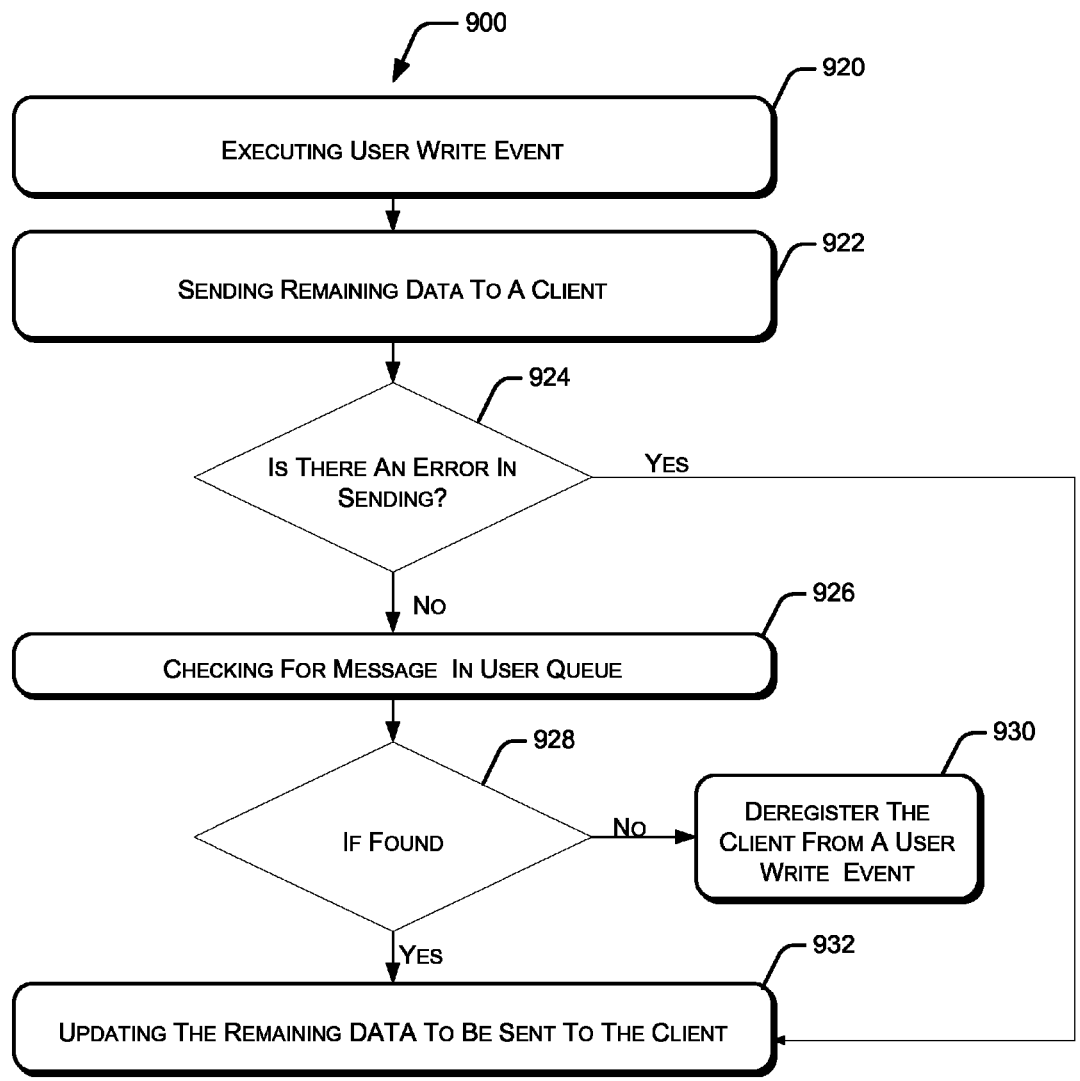
FIG. 9B illustrates a method of executing the user write event by the reverse worker thread, in accordance with an implementation of the present subject matter.

FIG. 9B illustrates a method of executing the user write event by the reverse worker thread, in accordance with an implementation of the present subject matter. The exemplary method may be described in the general context of computer executable instructions. Generally, computer executable instructions can include routines, programs, objects, components, data structures, procedures, modules, functions, etc., that perform particular functions or implement particular abstract data types.

At block 920, a user write event is executed. For example, the reverse worker thread 230 executes a user_write_callback function when the connection with at least one of the client devices is ready to receive the remaining data retrieved from the buffer. The buffer stores the partial messages received by the reverse worker thread 230, which are retrieved when the remaining part of the message is ready to be sent to the client device.

At block 922, the remaining data is sent to the client devices. For example, the remaining data retrieved from the buffer is queued to be sent as reply message 218 to the corresponding client 102 by the reverse worker thread 230. The reverse worker thread 230 prepares the reply message 218 in a similar manner by determining the corresponding connection related information in the hash table 220, and identifying the client 102 to which the reply message 218 has to be sent.

At block 924, a determination is made to ascertain whether there is an error in sending the retrieved remaining data to the client device. For example, the reverse worker thread 230 determines whether the retrieved remaining data is sent to the corresponding client 102 without any error or not. If there is an error in sending ('Yes' path from block 924), the reverse worker thread 230 updates the remaining data to be sent to the client 102 in the buffer and returns (block 932).

If the reverse worker thread 230 determines that the retrieved remaining data is sent to the client 102 without any error ('No' path from block 924), the reverse worker thread 230 then checks for any message in the user queue (block 926). In one implementation, the reverse worker thread 230 checks for the backlogged reply messages 218 that are enqueued in the user queue to be retrieved and sent to the client 102.

At block 928, a determination is made to ascertain whether the backlogged reply messages 218 are found in the user queue or not. For example, if the backlogged reply messages 218 are not found in the user queue ('No' path from block 928), the client 102 is deregistered from the user write event. In an implementation, on determining that the reply messages 218 does not exist in the user queue, the reverse worker thread 230 deregisters the client 102 from further user write event (block 930).

If the reverse worker thread 230 determines that the reply messages 218 does exist in the user queue ('Yes' path from block 928), the reverse worker thread 230 updates the remaining data to be sent to the client. For example, when the reverse worker thread 230 finds the backlogged reply messages 218 in the user queue, the reverse worker thread 230 updates the remaining data that is stored in the buffer, which can be later sent to the client 102 when the user_write_callback function is executed by the reverse worker thread 230.

Figure 10:
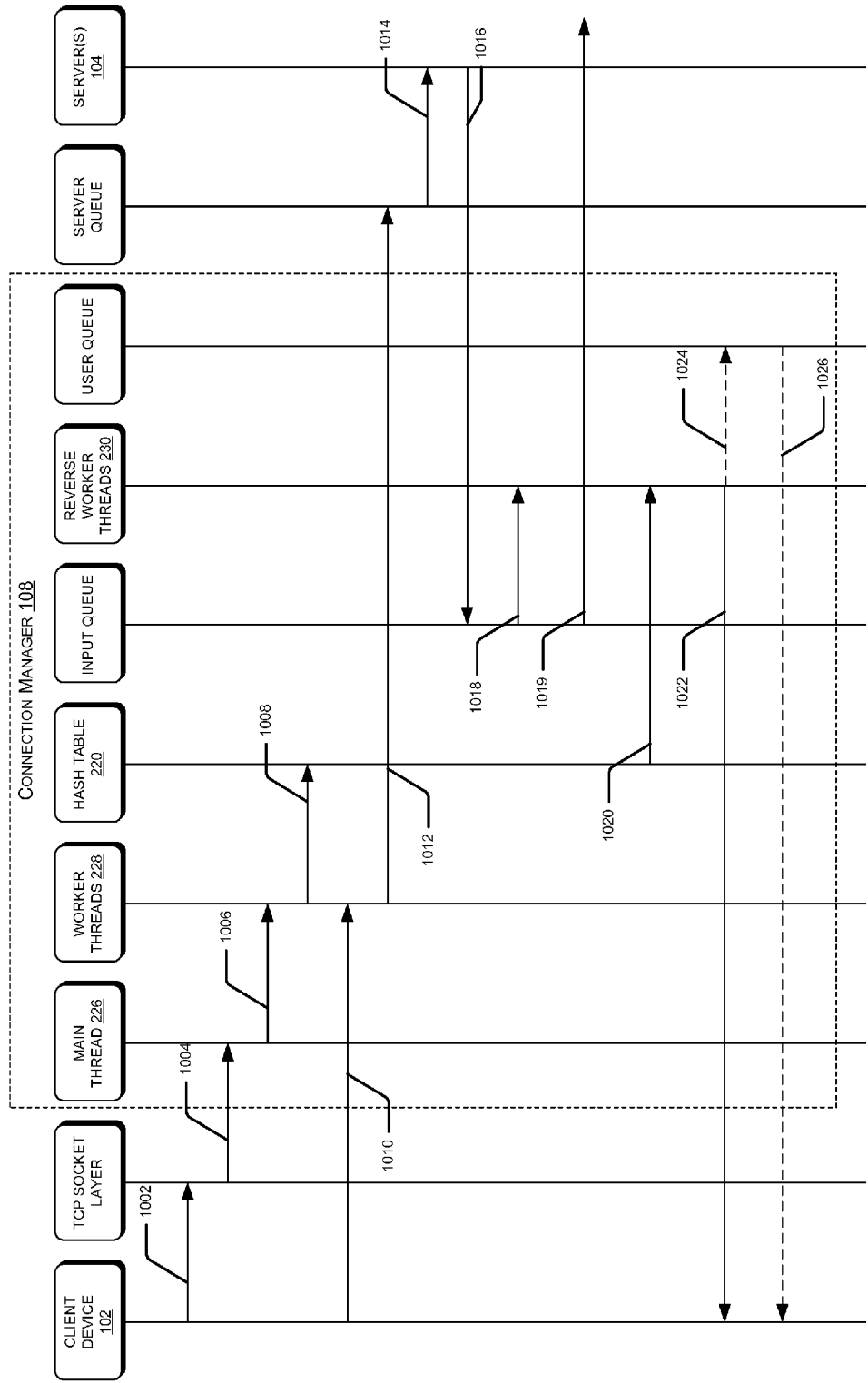
FIG. 10 illustrates a data and message flow between a plurality of entities through a connection manager, in accordance with an implementation of the present subject matter.

FIG. 10 illustrates a data and message flow between a plurality of entities through a connection manager, in accordance with an implementation of the present subject matter. The connection manager 108 manages the connection and controls the data transferred between the plurality of entities, say for example, clients 102 and servers 104. The connection manager 108, in order to manage the connection and control the data transfer between the clients 102 and the serves 104, includes execution of a plurality of connection manager processes, such as a main thread 226, a worker thread 228, and a reverse worker thread 230. The connection manager 108 also includes data stored intermittently in hash tables 220 allocated during the execution of the worker thread 228.

In one implementation, a connection request is received from the client 102 by the TCP socket layer (step 1002). The main thread 226 receives the connection request through the TCP socket layer (Step 1004). The main thread 226, on receiving the connection request, generates a UID and associates the UID with the connection request received from the client 102. The main thread 226 receives connection related information, which in an implementation is stack level information, such as socket ID through which the connection request is received. The main thread 226 associates the connection related information with the generated UID and sends the same to the worker thread 228 (step 1006).

In one implementation, the worker thread 228 allocates memory in hash table 220 for storing the connection related information received from the main thread 226 against the UID. Once allocated, the connection related information received from the main thread 226 against the UID is stored in the hash table 220 (step 1008). In parallel, the worker thread 228 receives client data 216 from the client 102, which in one implementation includes header information that contains details of the central server 104 to which the client data 216 is intended to be sent (step 1010).

The worker thread 228 prepares and sends a message 222 to the intended central server 104 by placing the message 222 in a server queue (step 1012). In one implementation, the worker thread 228 prepares the message 222 by including the UID along with client data 216 and places the message 222 in the server queue meant for the intended application 214 in the central server 104. The message 222 in the server queue is sent to the intended application 214 in the central server 104 (step 1014). Once the central server 104 receives the message 222, it processes the same to generate a reply message 218. As can be gathered the reply message 218 can be such in response to one or more functions that were performed based on the processing of the message 222. Subsequently, the reply message 218 is communicated to the reverse worker thread 230 by placing the reply message 218 in an input queue (step 1016).

The reply message 218 contains the UID that helps the reverse worker thread 230 to search the hash table 220. The reverse worker thread 230 reads the reply message 218 from the input queue (step 1018). On receiving the reply message 218, the reverse worker thread 230, based on the UID received in the reply message 218 searches the hash table 220 for client information, i.e., the connection related information that is stored in the hash table 220 against the UID.

If the reverse worker thread 230 is unable to retrieve any information related to the UID received in the reply message 218, the reverse worker thread 230 discards the message (step 1019). If the reverse worker thread 230 determines the corresponding connection related information in the hash table 220, it retrieves the information from the hash table 220 and prepares the reply message 218 based on the retrieved connection related information (step 1020).

The reverse worker thread 230 sends the prepared reply message 218 to the corresponding client 102 based on the connection related information retrieved from the hash table 220 (step 1022). In case of an error in the connection with the client 102 while sending the reply message 218, the reverse worker thread 230 copies remaining bytes in the hash table 220 and registers for a user write event. On registering for the user write event, the reverse worker thread 230 places the message in a user queue (step 1024). In one implementation, the user write event is also registered in case of a partial reply message 218 received from the application server 104. On receiving the remaining bytes that is stored for sending, the reverse worker thread 230 checks for the message placed in the user queue and update the bytes to send to the corresponding client 102 (step 1026).

As would be appreciated by a person skilled in the art, the implementations of the present subject matter would be implementable so as to allow integration of any application having a general architecture. Therefore, any system developed using UMC can be integrated with the connection manager 108. Furthermore, the implementations also allow the multiplexing and the demultiplexing between the server and the client allowing better handling and managing connections between the client, say one or more of the client devices 102 and the server 104. Still further, the connection manager 108 as per an implementation of the present subject matter load balances the incoming connection requests for efficient handling of the incoming connections. Also, the connection manager 108 is configured so as to handle different types of load, such as open loop load, close loop load, etc.

The connection manager 108, as indicated previously, includes the worker threads 228 and the corresponding reverse worker threads 230. This allows the connection manager 108 to handle any general architecture without the information in relation to the application architecture being available. Furthermore, the present description is described in reference to only one server 104. However, the same architectural set-up can be extended to multiple servers 104 easily.

The connection manager 108 also enables efficient messaging to the server 104, and to one or more of the client devices 102. Furthermore, each of the messages can be associated with a minimum latency so as to increase the efficiency of the message handling and message management. Further, the present subject matter provides architecture independent connection manager that can be deployed in any type of architecture. Moreover, the connection manager of the present subject matter can be used in conjunction with any deployed application, as the connection manager load manages the load balancing between one or more servers. Furthermore, the connection manager of the present subject matter is capable of centrally handling multiple applications that are deployed in one or more servers.

Although implementations for the present subject matter have been described in language specific to structural features and/or methods, it is to be understood that the present subject matter is not necessarily limited to the specific features or methods described. Rather, the specific features and methods are disclosed as exemplary implementations of the present invention.

We claim:

1. A method for managing a connection between at least one client and at least one application within a server in a network, the method comprising:
   receiving a connection request from the at least one client;
   identifying a least loaded worker thread by a main thread, wherein the least loaded worker thread is selected from a plurality of worker threads based on a number of clients associated with each worker thread within the plurality of worker threads;
   associating a unique identifier (UID), generated by the main thread, with the least loaded worker thread by utilizing a hash table, wherein the UID uniquely identifies the received connection request;
   communicating a message to the at least one application by the least loaded worker thread, wherein the message includes client data associated with the connection request;
   obtaining, by a reverse worker thread, corresponding to the least loaded worker thread, a reply message from the at least one application, wherein the reply message is associated with the UID, wherein the least loaded worker thread is uniquely associated with the reverse worker thread; and
   communicating, by the reverse worker thread, the reply message to the at least one client, wherein the reply message communication is based upon at least an event registration.

2. The method as claimed in claim 1, wherein the method further comprises, on receiving the connection request, determining by a main thread, the UID.

3. The method as claimed in claim 2, wherein the communicating further comprises:
   processing, by the least loaded worker thread, the connection request; and
   identifying, by the least loaded worker thread, the application based at least on a connection related information.

4. The method as claimed in claim 1, wherein the method further comprises associating the UID and the connection related information.

5. The method as claimed in claim 4, wherein the method further comprises identifying the at least one client to communicate the reply message, based at least on the associating of the UID and the connection related information.

6. The method as claimed in claim 2, wherein the main thread is initialized based on at least one configuration parameter obtained from a configuration settings file.

7. The method as claimed in claim 1, wherein the method further comprising:
   on detecting an error in communicating the reply message fully, retaining, by the reverse worker thread, a portion of the reply message not communicated;
   registering a user write event for the at least one client to which the reply message was to be communicated; and
   communicating the portion of the reply message not communicated.

8. A system comprising:
   a processor;
   a memory coupled to the processor, the memory comprising a connection manager module, wherein the connection manager module is configured to,
   generate a main thread, wherein the main thread is further configured to associate a unique identifier (UID) with a connection request received from at least one client;
   identify least loaded worker thread by the main thread, wherein the least loaded worker thread is selected from a plurality of worker threads based on a number of clients associated with each worker thread within the plurality of worker threads;
   associate, by the main thread utilizing a hash table, the UID to a least loaded worker thread, wherein the UID uniquely identifies the received connection request;
   communicate, by the least loaded worker thread, a message to at least one application, wherein the message includes client data associated with the connection request; and
   create, by the least loaded worker thread, a reverse worker thread, wherein the least loaded worker thread is uniquely associated with the reverse worker thread, and wherein the reverse worker thread is configured to:
      obtain a reply message associated with the UID from the at least one application, and
      send the reply message to the at least one client based at least on a connection related information associated with the connection request.

9. The system as claimed in claim 8, wherein the least loaded worker thread associates the UID and the connection related information using at least one hash table.

10. The system as claimed in claim 9, wherein the reverse worker thread retrieves the connection related information from the at least one hash table based on the UID associated with the reply message.

11. The system as claimed in claim 8, wherein the connection manager module is configured to initialize the main thread based on at least one configuration parameter specified in a configuration setting file, the at least one configuration parameter being one from a group comprising IP address, port address, listen path for worker thread, and maximum message size.

12. The system as claimed in claim 8, wherein the main thread is configured to listen for one or more incoming connection requests received from the at least one client by a TCP socket layer.

13. The system as claimed in claim 8, wherein the plurality of worker threads are generated by the main thread based on a configuration setting file.

14. The system as claimed in claim 8, wherein the least loaded worker thread is further configured to:
   register the least loaded worker thread with the main thread;
   open at least one server queue to send the message to the application; and open at least one incoming queue to receive the reply message from the application.

15. A computer-readable medium having computer-executable instructions that when executed perform acts comprising:
receiving a connection request from the at least one client;
identifying least loaded worker thread by a main thread, wherein the at least one worker thread is selected from a plurality of worker threads based on a number of clients associated with each worker thread within the plurality of worker threads;
associating a unique identifier (UID) with a least loaded worker thread, wherein the UID uniquely identifies the received connection request;
communicating a message to the application by the least loaded worker thread, wherein the message includes client data associated with the connection request;
obtaining, by a reverse worker thread, a reply message from the application, wherein the reply message is associated with the UID; and
communicating, by the reverse worker thread, the reply message to the at least one client,
wherein the least loaded worker thread is uniquely associated with the reverse worker thread.

* * * * *